(12) United States Patent
Kobayashi et al.

(10) Patent No.: US 11,282,518 B2
(45) Date of Patent: Mar. 22, 2022

(54) INFORMATION PROCESSING APPARATUS THAT DETERMINES WHETHER UTTERANCE OF PERSON IS SIMPLE RESPONSE OR STATEMENT

(71) Applicant: KYOCERA Document Solutions Inc., Osaka (JP)

(72) Inventors: Yuki Kobayashi, Osaka (JP); Nami Nishimura, Osaka (JP); Tomoko Mano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 349 days.

(21) Appl. No.: 16/479,306

(22) PCT Filed: Dec. 18, 2018

(86) PCT No.: PCT/JP2018/046437
§ 371 (c)(1),
(2) Date: Jul. 19, 2019

(87) PCT Pub. No.: WO2019/187397
PCT Pub. Date: Oct. 3, 2019

(65) Prior Publication Data
US 2021/0335352 A1    Oct. 28, 2021

(30) Foreign Application Priority Data

Mar. 29, 2018 (JP) .............................. JP2018-066137

(51) Int. Cl.
*G10L 15/26* (2006.01)
*G10L 15/22* (2006.01)

(52) U.S. Cl.
CPC .............. *G10L 15/22* (2013.01); *G10L 15/26* (2013.01)

(58) Field of Classification Search
CPC .......... G10L 15/26; G10L 17/00; G10L 21/10
See application file for complete search history.

(56) References Cited

U.S. PATENT DOCUMENTS

| 2009/0119246 A1* | 5/2009 | Kansal | .................... G06F 16/48 |
| 2011/0112833 A1* | 5/2011 | Frankel | ................. G06F 16/685 |
| | | | 704/235 |

(Continued)

FOREIGN PATENT DOCUMENTS

JP    2016-162339 A    9/2016

OTHER PUBLICATIONS

PCT search report for PCT/JP2018/046437, which is PCT application corresponding to the instant application, 2018. (Year: 2018).*

*Primary Examiner* — Jialong He
(74) *Attorney, Agent, or Firm* — ip

(57) ABSTRACT

An information processing apparatus as an image forming apparatus includes an utterance period detecting section, a simple response/statement determining section, and an HDD. The utterance period detecting section detects utterance periods of utterances of each person from voice data. The simple response/statement determining section converts the voice data to a text, determines, when the utterance in the detected utterance period falling within a first period contains any predetermined keyword, that the utterance is a simple response, determines the utterance made for a second period longer than the first period to be a statement, and extracts, for each person, a frequent keyword appearing a predetermined number of times or more in the utterances. The HDD stores determination results of the simple response/statement determining section, the utterance periods for the simple responses, and the utterance periods for the statements, together with the frequent keyword.

6 Claims, 17 Drawing Sheets

STATEMENT          SIMPLE RESPONSE          STATEMENT

(56) References Cited

U.S. PATENT DOCUMENTS

| | | | | |
|---|---|---|---|---|
| 2011/0131144 | A1* | 6/2011 | Ashour | G06Q 50/01 |
| | | | | 705/319 |
| 2011/0225013 | A1* | 9/2011 | Chavez | G06Q 10/109 |
| | | | | 705/7.18 |
| 2012/0323575 | A1* | 12/2012 | Gibbon | H04L 67/306 |
| | | | | 704/246 |
| 2013/0144603 | A1* | 6/2013 | Lord | G06F 40/58 |
| | | | | 704/9 |
| 2013/0290434 | A1* | 10/2013 | Bank | G06Q 10/10 |
| | | | | 709/206 |
| 2015/0310863 | A1* | 10/2015 | Chen | G10L 15/26 |
| | | | | 704/235 |
| 2016/0028895 | A1* | 1/2016 | Bell | H04L 12/18 |
| | | | | 455/416 |
| 2016/0284354 | A1* | 9/2016 | Chen | H04N 7/147 |
| 2018/0232705 | A1* | 8/2018 | Baker | G06F 3/0482 |
| 2019/0378076 | A1* | 12/2019 | O'Gorman | G06Q 10/06398 |
| 2019/0392837 | A1* | 12/2019 | Jung | G10L 15/22 |

\* cited by examiner

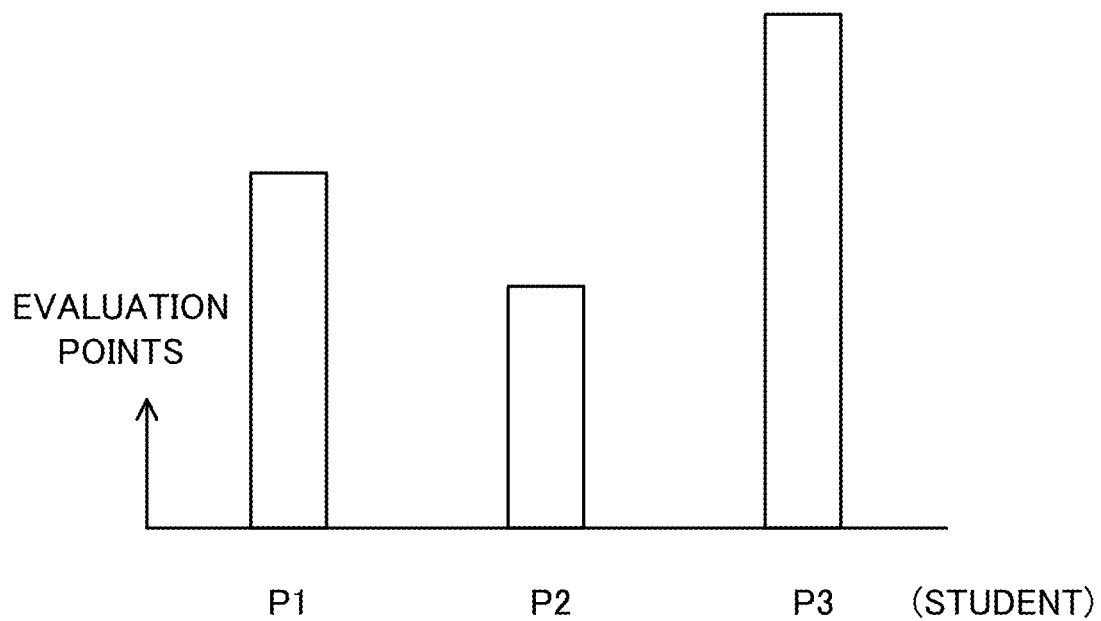

INFORMATION PROCESSING APPARATUS THAT DETERMINES WHETHER UTTERANCE OF PERSON IS SIMPLE RESPONSE OR STATEMENT

TECHNICAL FIELD

The present invention relates to information processing apparatuses and particularly relates to a technique for analyzing the contents of what has been spoken by a person.

BACKGROUND ART

Recently, there has been proposed a technique for estimating the activity of discussion on a group-by-group basis and clearly showing the status of these activities (see Patent Literature 1 below). This technique is that the speech times and speech periods at and for which each member of each of groups spoke are stored, the speech times and speech periods of each member are separated in time series on a group-by-group basis, and the ratio of the speech period of each member of each group to the speech period of all the members of the group is calculated to create group by group a graph where the respective speech density contribution ratios of the members are drawn.

CITATION LIST

Patent Literature

Patent Literature 1: JP-A-2016-162339

SUMMARY OF INVENTION

The above technique provides the respective speech density contribution ratios of the members for the purpose of determining whether the discussion of the group is becoming active. However, the speech density contribution ratio is nothing more than the ratio of the speech period of each member of the group to the speech period of all the members of the group. In other words, in the above technique, only the period of time when each member spoke is used for the calculation of the speech density contribution ratio for the member and the contents of utterance of the member are not used for the calculation of the speech density contribution ratio. Therefore, according to the above technique, the type of utterance of each member cannot be determined.

The present invention has been made in view of the foregoing circumstances and is therefore aimed at, upon speech of a person, analyzing even the type of utterance of the person and providing the analysis result.

An information processing apparatus according to an aspect of the present invention includes: a communication interface through which data is communicated externally; an utterance period detecting section that extracts utterances of each of persons from voice data acquired through the communication interface and detects respective utterance periods of the extracted utterances; a simple response/ statement determining section that converts the voice data to a text, determines whether or not each of the utterance periods detected by the utterance period detecting section falls within a predetermined first period, determines, when the utterance falling within the first period contains any of predetermined keywords, that the utterance is a simple response, determines the utterance made for a predetermined second period longer than the first period to be a statement, and extracts, for each of the persons, a frequent keyword appearing a predetermined number of times or more in the utterances of the person; and a storage unit that stores results determined by the simple response/statement determining section, the utterance periods for the simple responses, and the utterance periods for the statements, together with the frequent keyword, wherein when the utterance contains a specific keyword further specified from among the predetermined keywords, the simple response/statement determining section determines the utterance to be a simple response and also determines the utterance to be an agreement response indicating consent.

An information processing apparatus according to another aspect of the present invention includes a communication interface through which data is communicated externally, a storage unit, and a control unit that includes a processor and, upon execution of a speech analysis program by the processor, functions as: an utterance period detecting section that extracts utterances of each of persons from voice data acquired through the communication interface and detects respective utterance periods of the extracted utterances; and a simple response/statement determining section that converts the voice data to a text, determines whether or not each of the utterance periods detected by the utterance period detecting section falls within a predetermined first period, determines, when the utterance falling within the first period contains any of predetermined keywords, that the utterance is a simple response, determines the utterance made for a predetermined second period longer than the first period to be a statement, extracts, for each of the persons, a frequent keyword appearing a predetermined number of times or more in the utterances of the person, and allows the storage unit to store determination results each indicating that the utterance is the simple response or the statement, the utterance periods for the simple responses, and the utterance periods for the statements, together with the frequent keyword. When the utterance contains a specific keyword further specified from among the predetermined keywords, the simple response/statement determining section determines the utterance to be a simple response and also determines the utterance to be an agreement response indicating consent.

The present invention enables, upon utterance of a person, analysis of even the type of utterance of the person and provision of the analysis result.

DESCRIPTION OF EMBODIMENTS

Figure 1:
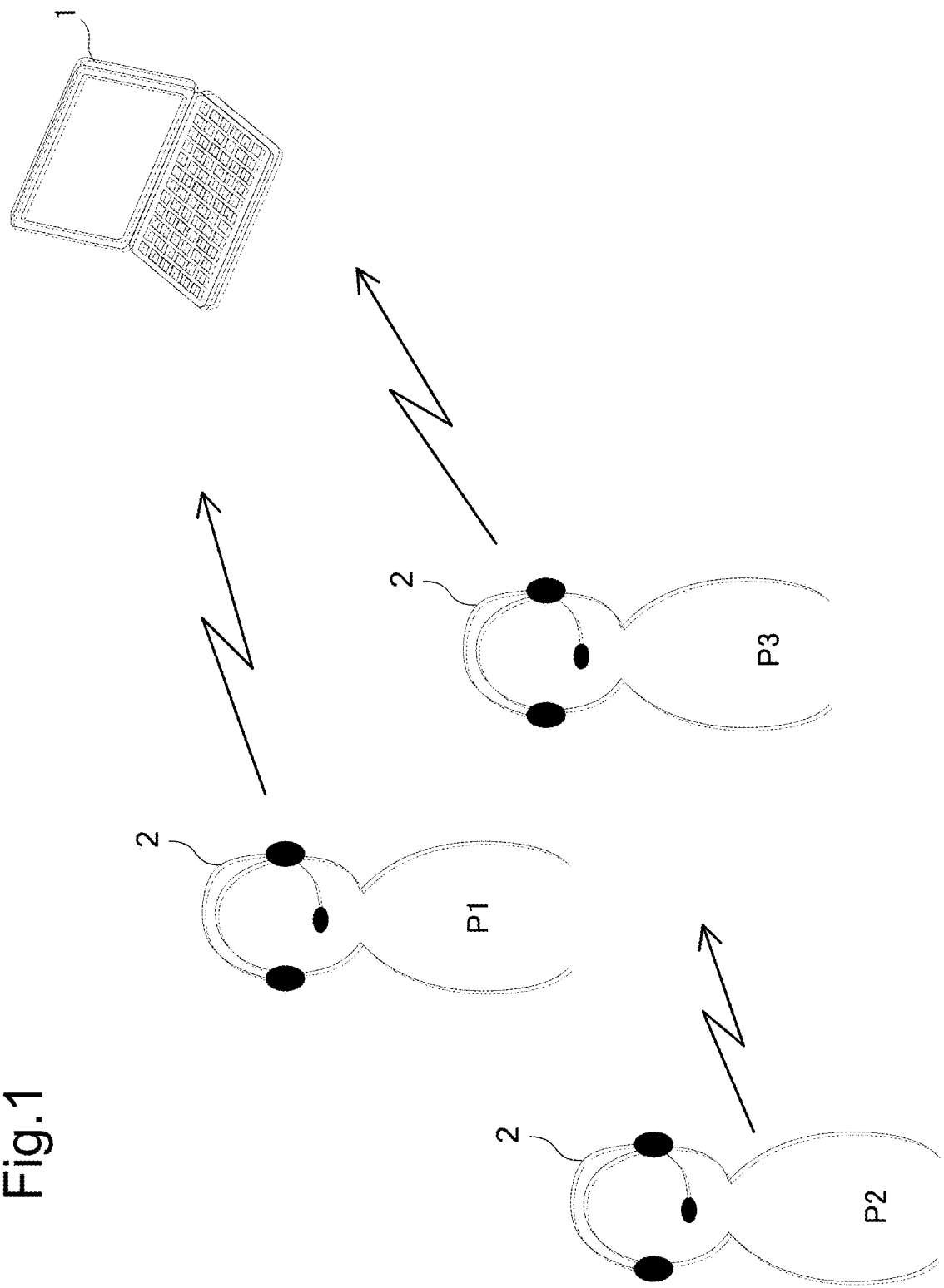
FIG. 1 is a view showing an information processing apparatus according to a first embodiment of the present invention and persons to be subjected to speech analysis by the information processing apparatus.

Hereinafter, a description will be given of an information processing apparatus, such as an image forming apparatus, a speech analysis program, an evaluation program, a speech analysis method, and an evaluation method, each according to one embodiment of the present invention, with reference to the drawings. FIG. 1 is a view showing an information processing apparatus according to a first embodiment of the present invention and persons to be subjected to speech analysis by the information processing apparatus.

The information processing apparatus 1 acquires as a piece of voice data voice uttered by each person of a communication group made up of a plurality of persons. For example, suppose that a communication group made up of a plurality of persons P1, P2, and P3 (which are specified as three persons in this embodiment, but not limited to three persons) is having a meeting, a lesson, a conference or the like (hereinafter, collectively referred to simply as a meeting). Each person of the communication group speaks while using a headset 2 with a microphone function. Specifically, the headset 2 used by each person acquires voice of communication of the person wearing the headset 2, converts the voice to an electric signal, and outputs the electric signal representing the voice to the information processing apparatus 1. The information processing apparatus 1 and each headset 2 are connected, for example, by wire communication using a cable connection or wireless communication, such as Bluetooth (registered trademark) or a wireless LAN. The information processing apparatus 1 converts the electric signal output from each headset 2 and representing the voice to a piece of voice data consisting of a digital voice signal and stores the respective pieces of voice data from the individual headsets 2, i.e., on the individual persons P1, P2, and P3.

Figure 2:
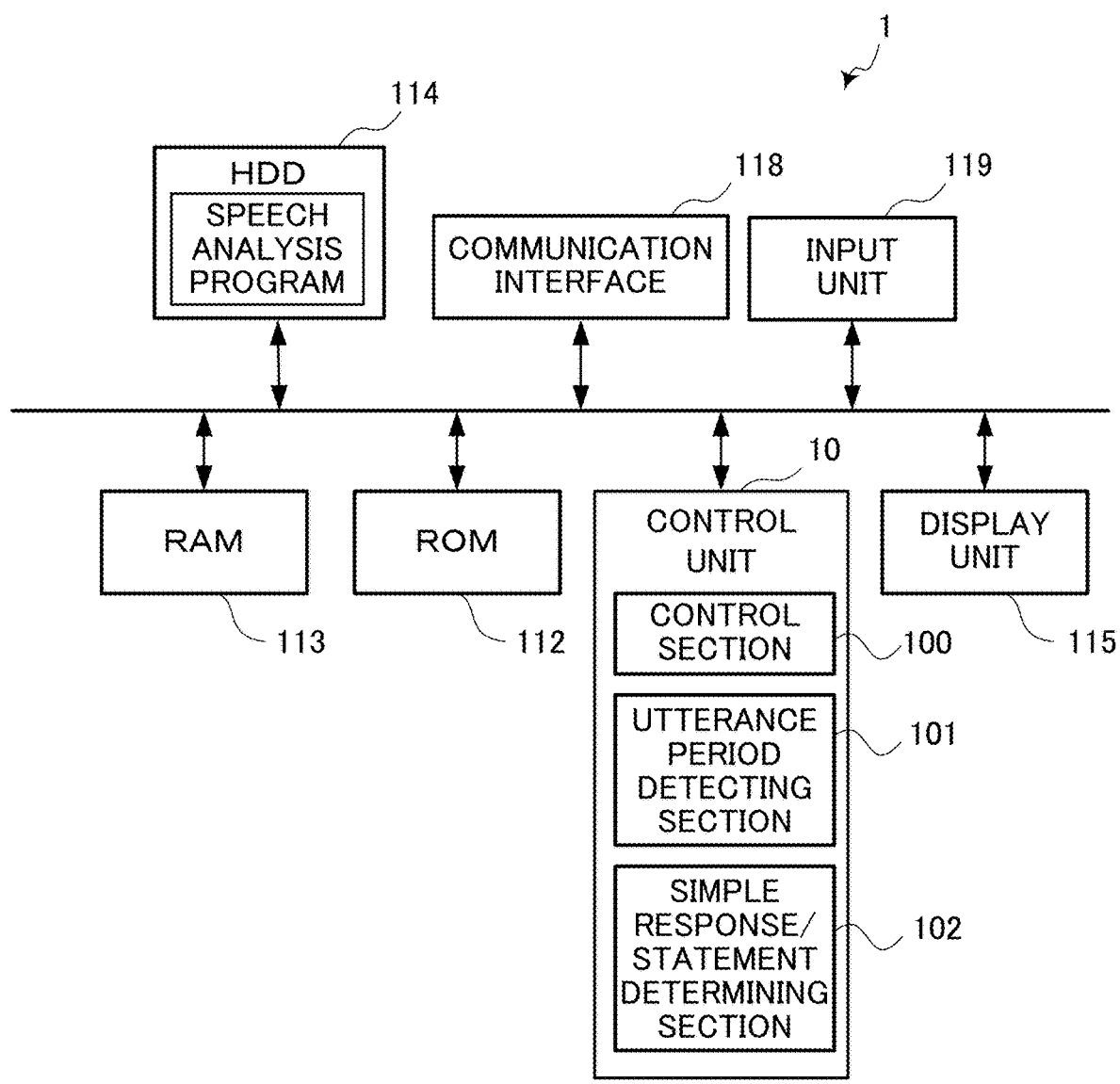
FIG. 2 is a block diagram showing an outline of an internal configuration of the information processing apparatus according to the first embodiment.

Next, a description will be given of the structure and configuration of the information processing apparatus 1 according to the first embodiment. FIG. 2 is a block diagram showing an outline of an internal configuration of the information processing apparatus 1 according to the first embodiment.

The information processing apparatus 1 is, for example, a computer. The information processing apparatus 1 includes a control unit 10, a ROM (Read Only Memory) 112, a RAM (Random Access Memory) 113, an HDD (Hard Disk Drive) 114, a display unit 115, a communication interface 118, and an input unit 119. These components and sections are capable of transferring data or signals to and from each other via a CPU (Central Processing Unit) bus.

The control unit 10 governs the operation control of the entire information processing apparatus 1. The ROM 112 stores an operating program for basic operations of the information processing apparatus 1. The RAM 113 is used as a work area or the like for the control unit 10.

The HDD 114 holds, in part of its storage area, a speech analysis program according to one embodiment of the present invention. Furthermore, the HDD 144 stores the respective pieces of voice data on the persons P1, P2, and P3. The HDD 114 is an example of the storage unit in Claims. Alternatively, a non-volatile ROM mounted in the information processing apparatus 1 (for example, one incorporated in the control unit 10) may function as the storage unit.

Each headset 2 connected to the information processing apparatus 1 is previously assigned identification information for identifying the headset 2. No particular limitation is placed on the type of identification information so long as it is information that enables identification of the headset 2, but an example is an identification number. The HDD 114 previously stores the identification information on the basis of each headset 2.

The display unit 115 is formed of an LCD (Liquid Crystal Display) or the like and displays operation guidance and the like for an operator operating the information processing apparatus 1.

The communication interface 118 includes a USB interface, a wireless LAN interface or the like. The communication interface 118 serves as an interface for performing data communication with each of the headsets 2.

The input unit 119 is made up of a keyboard, a mouse or the like, through which operation instructions are input by the operator.

The control unit 10 is formed of a processor, a RAM, a ROM, and so on. The processor is a CPU, an MPU (Micro Processing Unit), an ASIC (Application Specific Integrated Circuit) or the like. When a speech analysis program stored on the HDD 114 is executed by the processor described above, the control unit 10 functions as a control section 100, an utterance period detecting section 101, and a simple response/statement determining section 102. Alternatively, the control section 100, the utterance period detecting section 101, and the simple response/statement determining section 102 may be constituted by hardware circuits.

The control section 100 has the function of governing the operation control of the entire information processing apparatus 1.

Figure 3:
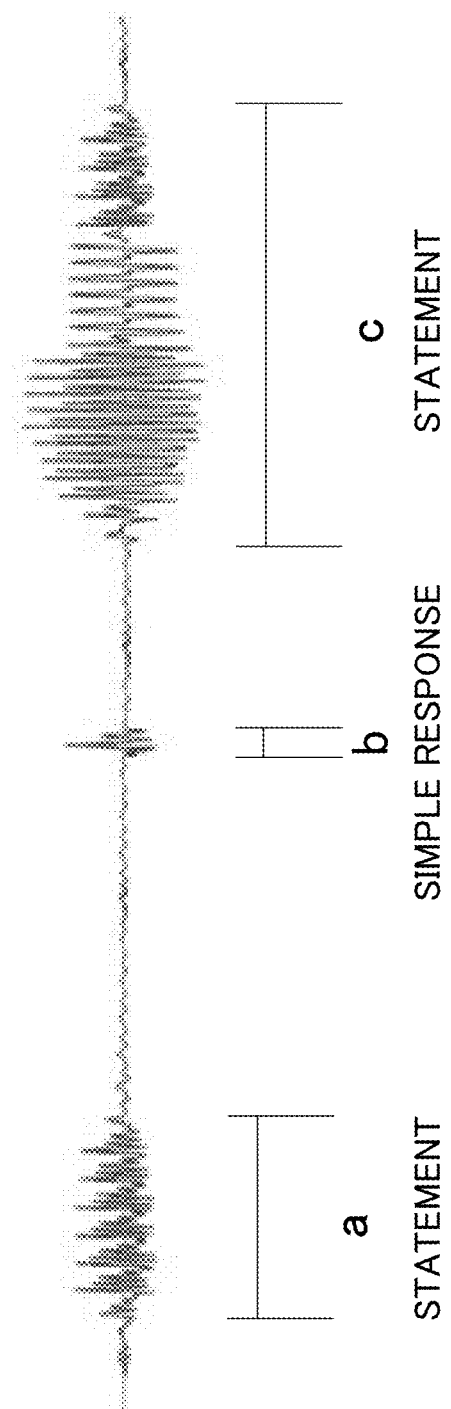
FIG. 3 is a graph showing an example of voice data.

The utterance period detecting section 101 detects, from each of the respective pieces of voice data on the persons P1, P2, and P3 stored on the HDD 114, the utterance period of each utterance in speech recorded in the piece of voice data. FIG. 3 is a graph showing an example of the piece of voice data. In FIG. 3 the vertical axis represents the amplitude (unit: dB) of sound and the horizontal axis represents time. The utterance period detecting section 101 analyzes the piece of voice data and extracts as an utterance, among a sequence of amplitudes indicated by the piece of voice data, a subsequence of amplitudes where amplitudes having a predetermined width (for example, 20 dB) or more continue for a previously specified period (for example, 0.25 seconds) or more. In the case of the piece of voice data shown in FIG. 3, the utterance period detecting section 101 extracts a subsequence a, a subsequence b, and a subsequence c as utterances. The utterance period detecting section 101 detects as an utterance period a period of time when each extracted utterance continues.

If the above utterance period detected by the utterance period detecting section 101 falls within a predetermined first period (a width of periods ranging from the above specified period to a predetermined period longer than the specified period, for example, a width of periods ranging from a period of 0.25 seconds as the specified period to 2.0 seconds), the simple response/statement determining section 102 determines the utterance made in the utterance period as a simple response (b in the example of FIG. 3). On the other hand, if the above utterance period detected by the utterance period detecting section 101 is a predetermined second period longer than the first period (i.e., a period of time exceeding the first period), the simple response/statement determining section 102 determines the utterance made for the utterance period as a statement (a and c in the example of FIG. 3). The simple response/statement determining section 102 allows the HDD 114 to store the determined results each indicating a simple response or a statement, the utterance periods for simple responses, and the utterance periods for statements.

Furthermore, the simple response/statement determining section 102 includes a known voice recognition function and uses the voice recognition function to convert the voice data into characters and thus form a text. The simple response/statement determining section 102 detects, from all the utterances made, for example, by the person P1, words contained in the utterances. If the same word is detected a plurality of times, the simple response/statement determining section 102 counts the number of detections of the word. The simple response/statement determining section 102 extracts, among the detected words, a word appearing a predetermined number of times (for example, five times) or more as a frequent keyword. In the same manner, the simple response/statement determining section 102 extracts frequent keywords from the pieces of voice data on all the persons.

Figure 4:
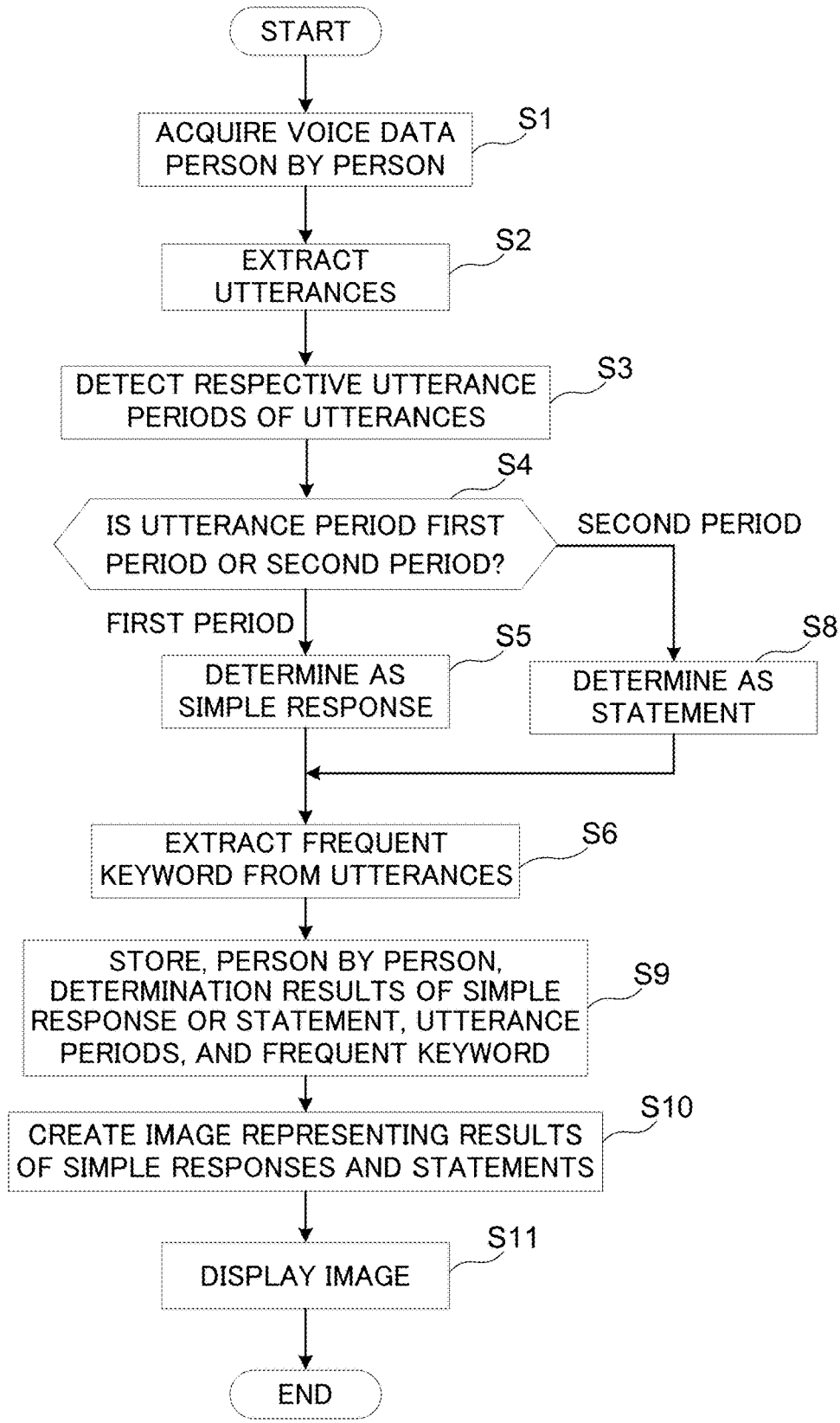
FIG. 4 is a flowchart showing speech analysis processing of the information processing apparatus according to the first embodiment.

Next, a description will be given of speech analysis processing of the information processing apparatus 1 according to the first embodiment. FIG. 4 is a flowchart showing the speech analysis processing of the information processing apparatus 1.

The scene where the speech analysis is performed is a scene where a communication group made up of a plurality of persons P1, P2, and P3 is having a meeting. The persons P1, P2, and P3 wear their respective headsets 2 and each headset 2 is connected communicably with the information processing apparatus 1 as described previously. In this state, the persons P1, P2, and P3 have speech with each other in the meeting. Voices emanating from the persons P1, P2, and P3 are collected by the respective headsets 2 worn by the persons P1, P2, and P3 and output to the information processing apparatus 1.

The information processing apparatus 1 acquires, from the headsets 2, respective pieces of voice data through the communication interface 118 (step S1). Specifically, when the communication interface 118 receives an electric signal output from each headset 2 and representing the voice, the utterance period detecting section 101 converts the acquired electric signal representing the voice to a piece of voice data consisting of a digital voice signal and allows the HDD 114 to store the piece of voice data. The utterance period detecting section 101 allows the HDD 114 to store each of the pieces of voice data on the basis of each of the persons P1, P2, and P3, that is, in association with the individual identification information stored on the HDD 114.

Subsequently, in the manner described previously, the utterance period detecting section 101 extracts, from each of the respective pieces of voice data stored on the HDD 114 on the basis of each of the persons P1, P2, and P3, utterances made in speech represented by the piece of voice data (step S2). Then, the utterance period detecting section 101 detects the utterance period of each extracted utterance (step S3).

Then, the simple response/statement determining section 102 determines whether the utterance period of each utterance falls within the first period or is the second period (step S4). When the utterance period falls within the first period ("FIRST PERIOD" in step S4), the simple response/statement determining section 102 determines the utterance made in the above utterance period to be a simple response (step S5). On the other hand, when the utterance period is the second period ("SECOND PERIOD" in step S4), the simple response/statement determining section 102 determines the utterance made for the utterance period to be a statement (step S8).

Furthermore, the simple response/statement determining section 102 uses the voice recognition function to convert the pieces of voice data on the persons P1, P2, and P3 into characters, thus forms texts, and extracts, on the basis of each of the persons P1, P2, and P3, a frequent keyword from the individual piece of voice data (step S6). The simple response/statement determining section 102 allows the HDD 114 to store, on the basis of each of the persons P1, P2, and P3, the determination results each indicating that the utterance is a simple response or a statement, the respective utterance periods for simple responses and statements, and an extracted frequent keyword together (step S9).

Figure 5:
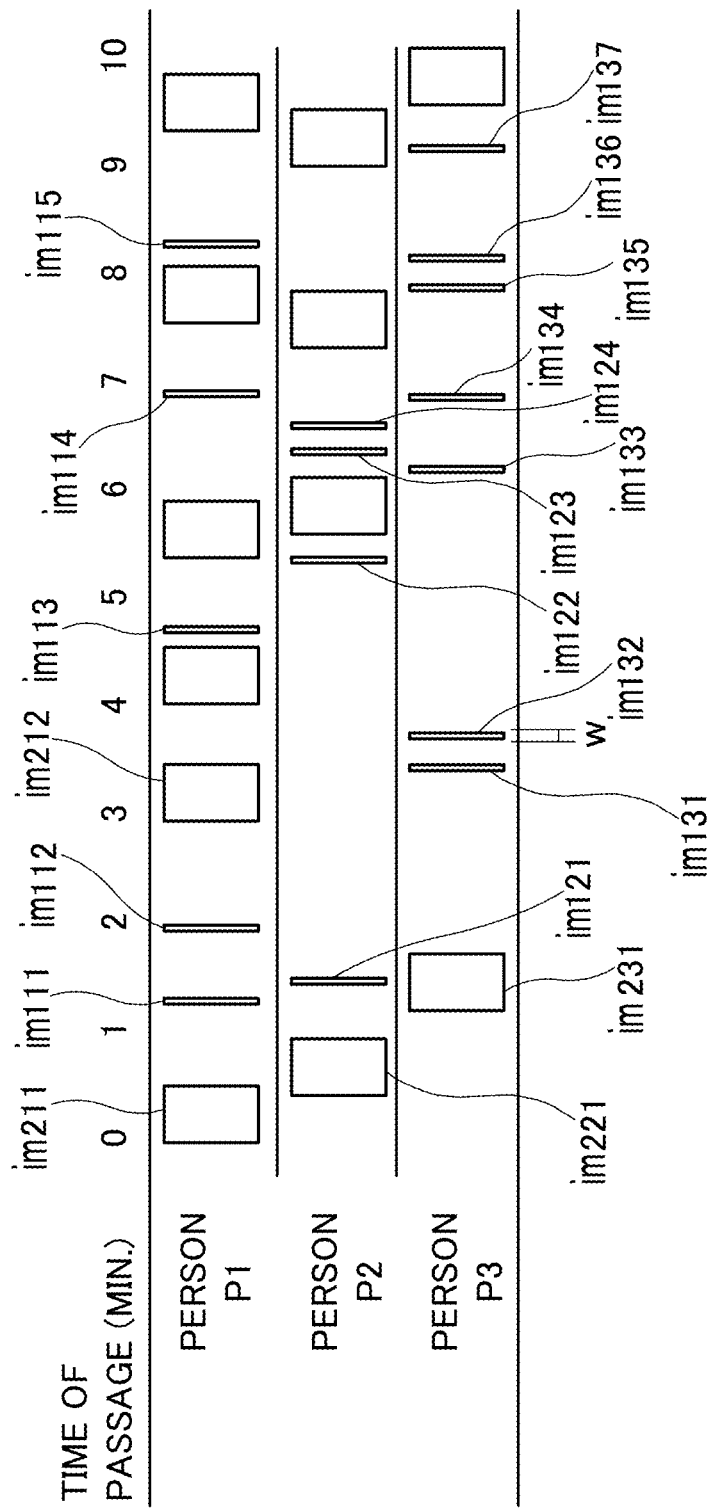
FIG. 5 is a diagram showing utterances of persons in different shapes according to their utterance periods.

The simple response/statement determining section 102 creates graphics that represent, separately on the basis of each of the persons P1, P2, and P3, the determination results each indicating that the utterance is a simple response or a statement, as shown as an example in FIG. 5 (step S10). The control section 100 allows the display unit 115 to display the created graphics (step S11). If, at this time, the information processing apparatus 1 is an image forming apparatus, the graphics created in step S10 and data as texts converted from the pieces of voice data may be printed out.

If the information processing apparatus 1 is an image forming apparatus, the information processing apparatus 1 has a mechanism for forming an image on a recording paper sheet which is an example of the recording medium. The mechanism includes, for example, an image forming unit, a fixing section, and s sheet feed section.

The image forming unit includes a photosensitive drum, a charging device, an exposure device, a developing device, and a transfer device. The image forming unit forms, on a recording paper sheet fed from the sheet feed section, a toner image corresponding to the graphics created in step S10, an image representing the voice data converted to texts or other images.

The fixing section applies heat and pressure to the recording paper sheet on the surface of which the toner image is formed by the image forming unit, thus fixing the toner image on the recording paper sheet. After the fixation of the fixing section, the recording paper sheet having an image formed thereon is discharged to the outside of the information processing apparatus 1.

The sheet feed section pulls out recording paper sheets contained in a sheet cassette or recording paper sheets put on a manual feed tray sheet by sheet by a pick-up roller and feeds forward the pulled-out recording paper sheet to the image forming unit.

FIG. 5 is a diagram showing the utterances of the persons P1, P2, and P3 in different shapes according to their utterance periods.

The control section 100 allows the display unit 115 to display, separately on the basis of each of the persons P1, P2, and P3, the results determined by the simple response/statement determining section 102 and each indicating a simple response or a statement, as shown as an example in FIG. 5.

For example, in FIG. 5, the horizontal axis represents the axis of time, and reed-shaped graphics im shown in respective columns for the persons P1, P2, and P3 (referring to all the reed-shaped graphics shown in FIG. 5) are graphics representing the utterances. In each of the columns for the persons P1, P2, and P3, the graphics im for the number of utterances are shown arranged at respective locations corresponding to the times of utterance. Furthermore, the width of each graphic im is set to a length according to the utterance period. In other words, the longer the utterance period, the longer the width of the graphic im is set to be. The vertical dimension of each graphic im is set to be identical regardless of the length of the utterance period.

Referring to the above diagram, the user having seen the diagram can know, about the utterances made by the persons P1, P2, and P3 and on the basis of each person, the number of utterances from the number of graphics im and also the times of utterance from the locations of the graphics im shown on the diagram.

Supposing that the first period is a width w shown in FIG. 5, graphics im formed with widths shorter than the width w indicate simple responses and graphics im formed with widths equal to or longer than the width w indicate statements. Alternatively, depending on the simple response or the statement, the simple response/statement determining section 102 may (i) make the graphics im have different colors or (ii) create each graphic im with the addition of a note indicating a simple response or a statement next to the graphic im.

By seeing the diagram shown in FIG. 5, the user can also know when and what type of utterance was made by each of the persons P1, P2, and P3. Furthermore, since FIG. 5 uses a common axis of time to the persons P1, P2, and P3, the user can also know the anteroposterior relationship between respective utterances made by one person and another.

For example, referring to FIG. 5, the user can know that, among all the persons, the person P1 first made a statement (graphic im211), the person P2 also made a statement (graphic im221) following the statement of the person P1, and then the person P3 also made a statement (graphic im231) following the statement of the person P2.

For another example, the user can know that the person P1 made successive simple responses (graphics im111 and im112) immediately after the statement (graphic im221) of the person P2 and the person P3 made successive simple responses (graphics im131 and im132) immediately after a statement (graphic im212) of the person P1.

Moreover, the user can know, from FIG. 5, that the person P1 made six statements for ten minutes, the person P2 four statements for ten minutes, the person P3 made two statements for ten minutes, and therefore, the person P1 made the largest number of statements. From this result, the user can assume that the person P1 made statements most actively.

On the other hand, because the person P1 made five simple responses (graphics im111 to im115) for ten minutes, the person P2 made four simple responses (graphics im121 to im124) for ten minutes, and the person P3 made seven simple responses (graphics im131 to 137) for ten minutes, it can be known that the person P3 made the largest number of simple responses. From this result, the user can assume that the person P3 had the firmest intention to listen to the statements of others.

The simple response/statement determining section 102 may determine, as a simple response, only an utterance subsequently made immediately after an utterance determined as a statement. In this case, for example, in FIG. 5, only the graphics im111, im112, im123, im124, im131, im132, im135, and im136 are determined to be simple responses by the simple response/statement determining section 102.

As thus far described, the first embodiment enables, upon utterance of a person, analysis of even the type of utterance of the person and provision of the analysis result.

Figure 6:
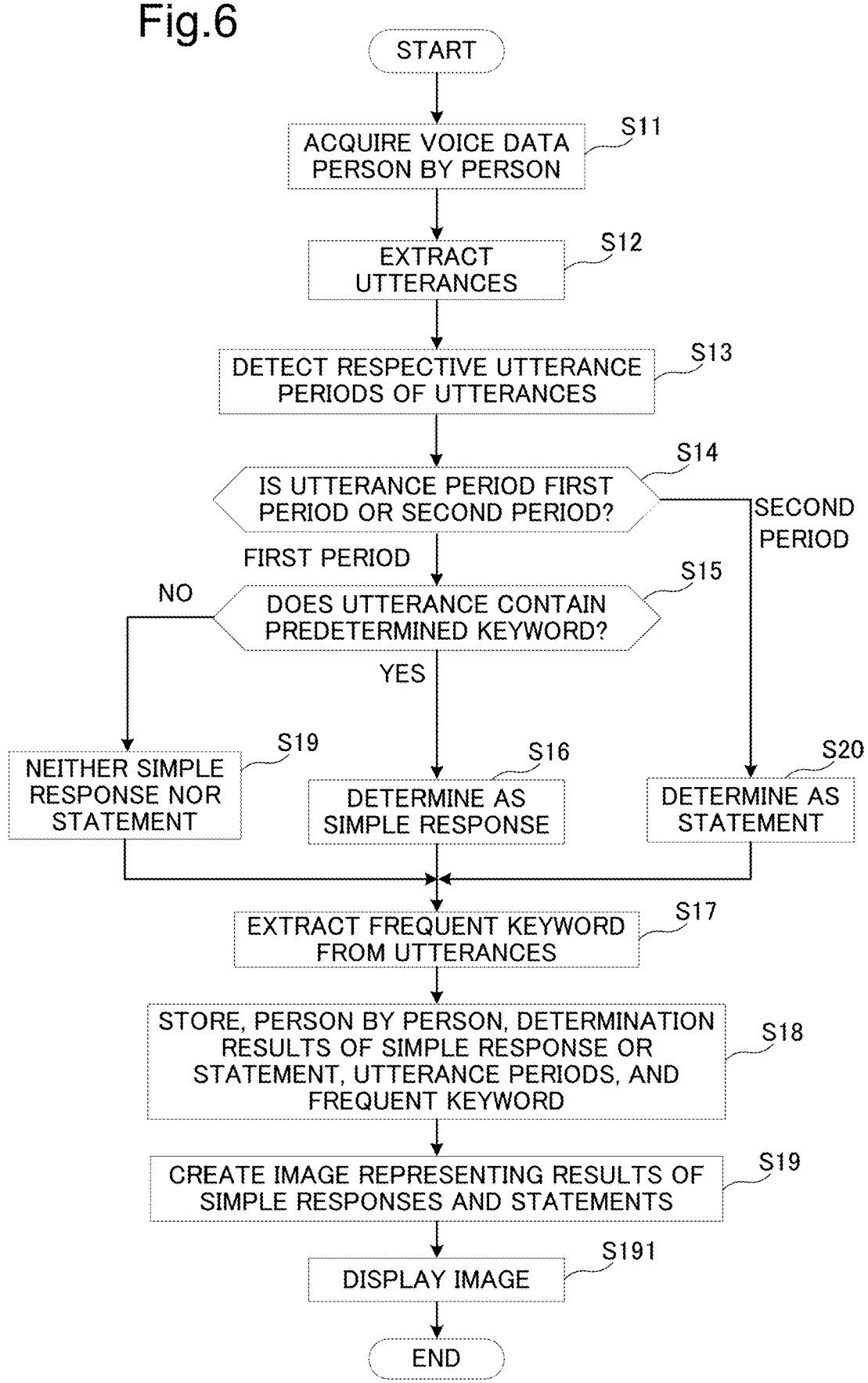
FIG. 6 is a flowchart showing a first modification of the speech analysis processing of the information processing apparatus.

Next, a description will be given of a first modification of the speech analysis processing of the information processing apparatus 1. FIG. 6 is a flowchart showing the first modification of the speech analysis processing of the information processing apparatus 1. In the description of the first modification, further explanation of the same processing stages as in the first embodiment will be omitted.

In the first modification, when, after processing stages in steps S11 to S13 which are the same processing stages in steps S1 to S3 in the first embodiment, the simple response/statement determining section 102 determines, in step S14, that the utterance period of an utterance falls within the first period ("FIRST PERIOD" in step S14), the simple response/statement determining section 102 further determines whether or not the utterance contains any predetermined keyword (step S15). For example, the simple response/statement determining section 102 uses, at the time of step S15, the voice analysis function to convert each of the pieces of voice data on the persons P1, P2, and P3 to a text and determines whether or not each utterance contains as a predetermined keyword, for example, "Right", "Is it true", "I see", "No way", "Yes", "No", "Yeah" or "Not at all". The data converted to a text in the above manner is also used in extracting a frequent keyword in step S17.

When determining that the utterance contains a predetermined keyword (YES in step S15), the simple response/statement determining section 102 determines the utterance to be a simple response (step S16). In other words, in the first modification, the simple response/statement determining section 102 determines an utterance to be a simple response when the conditions that the utterance period of the utterance falls within the first period and the utterance contains any predetermined keyword are met.

When determining that the utterance contains no predetermined keyword (NO in step S15), the simple response/statement determining section 102 determines the utterance to be neither simple response nor statement (step S19).

According to the first modification, the determination of whether an utterance is a simple response or a statement by the simple response/statement determining section 102 is made using not only an element of the period but also an element of whether the utterance contains any predetermined keyword. Therefore, when the simple response/statement determining section 102 determines an utterance of a person to be a simple response, the reliability of determination that the utterance is a simple response can be further increased.

Figure 7:
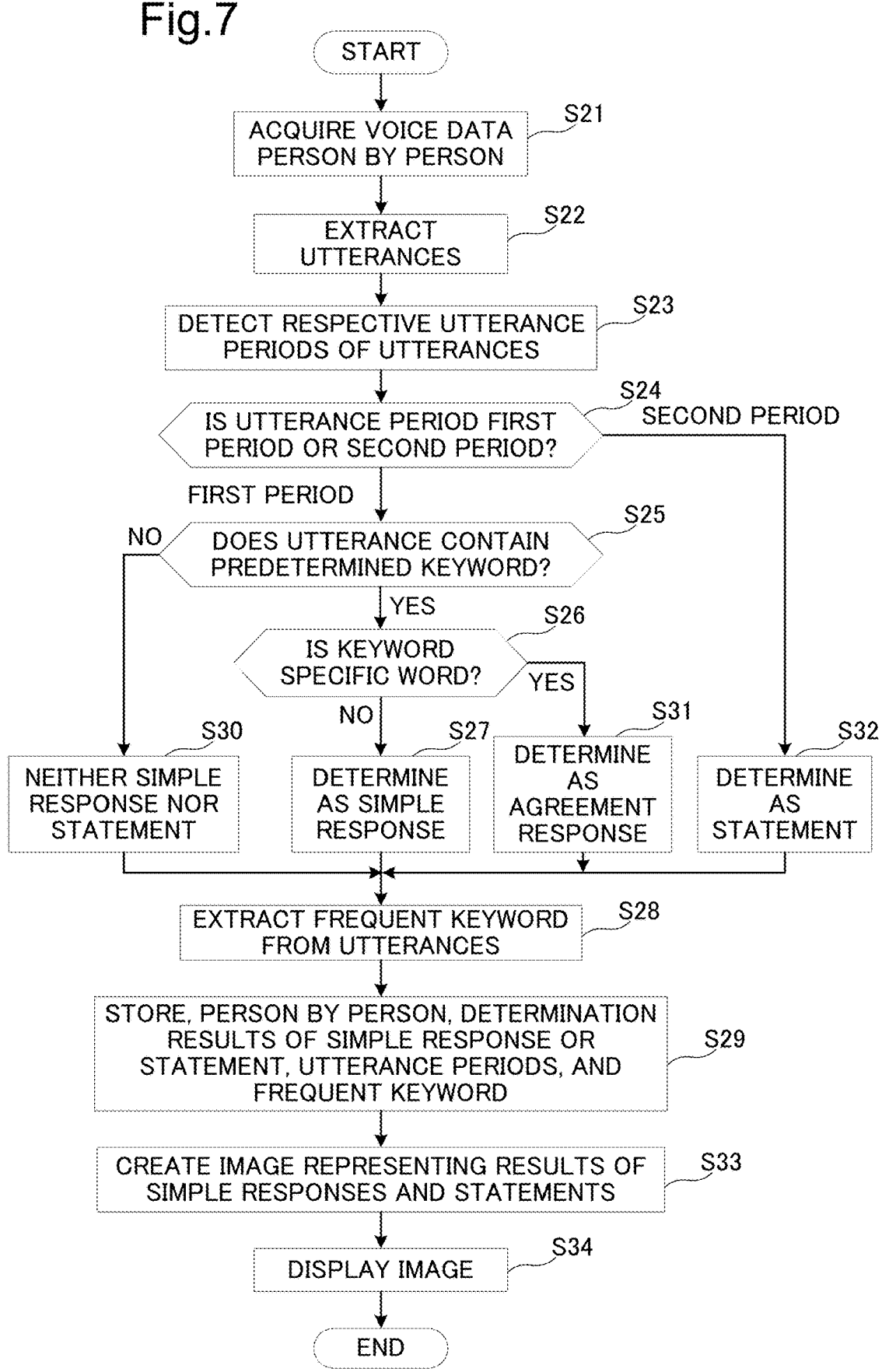
FIG. 7 is a flowchart showing a second modification of the speech analysis processing of the information processing apparatus.

Next, a description will be given of a second modification of the speech analysis processing of the information processing apparatus 1. FIG. 7 is a flowchart showing the second modification of the speech analysis processing of the information processing apparatus 1. In the description of the second modification, further explanation of the same processing stages as in the first embodiment and the first modification will be omitted.

In the second modification, when, after processing stages in steps S21 to S24 which are the same processing stages in steps S11 to S14 in the first modification, the simple response/statement determining section 102 determines, in step S25, that the utterance contains any of the above predetermined keywords (YES in step S25), the simple response/statement determining section 102 further determines, if the utterance subjected to the processing stage in step S25 contains any specific keyword further specified from among the above predetermined keywords (YES in step S26), that the utterance is a simple response and particularly an agreement response indicating consent (step S31). For example, when the utterance subjected to the processing stage in step S25 contains as a specific keyword, for example, "Right", "I see", "Yes" or "Yeah", the simple response/statement determining section 102 determines the utterance to be an agreement response.

According to the second modification, since the simple response/statement determining section 102 further determines, from among simple responses, an agreement response, it is possible to determine even whether or not a person having made a simple response agrees with a statement of another person.

Figure 8:
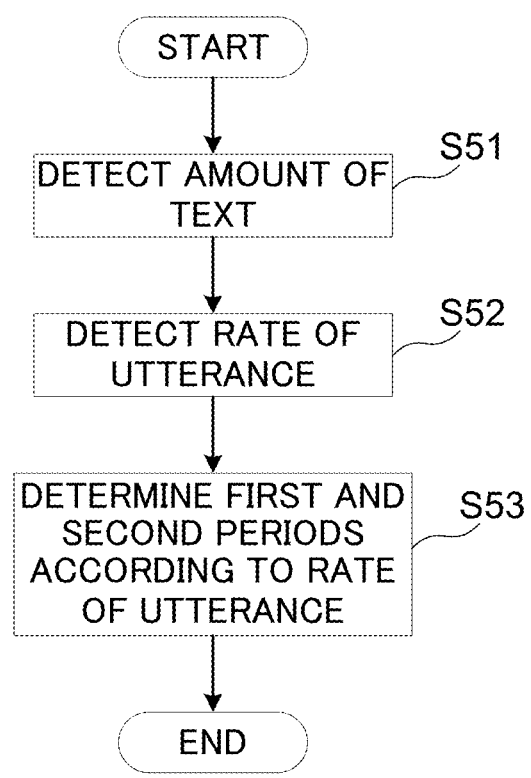
FIG. 8 is a flowchart showing determination processing for determining first and second periods different from person to person.

Although, in the first embodiment, the first modification, and the second modification, the simple response/statement determining section 102 uses, as the first period for use in the determination of a simple response and the second period for use in the determination of a statement, common periods to the persons P1, P2, and P3, the simple response/statement determining section 102 may use, as each of the first period and the second period, different periods from person to person. FIG. 8 is a flowchart showing determination processing for determining first and second periods different from person to person. The determination processing is made between step S3 and step S4 in the first embodiment, between step S13 and step S14 in the first modification, or between step S23 and step S24 in the second modification.

For example, after the processing for detecting the respective utterance periods of the utterances is performed by the utterance period detecting section 101 (step S3, step S13 or step S23), the simple response/statement determining section 102 converts the contents of all the utterances of the persons P1, P2, and P3 to texts, for example, by the voice recognition function and detects the respective amounts of text of the utterances (step S51).

Subsequently, the simple response/statement determining section 102 divides each of the detected amounts of text by the utterance period of the utterance from which the amount of text has been detected, thus calculating the obtained value as a rate of utterance. The simple response/statement determining section 102 performs the calculation of the rate of utterance for every utterance of the persons P1, P2, and P3, calculates, on a person-by-person basis, an average rate of the rates of utterance for all the utterances made by the person, and defines the calculated average rate as the rate of utterance specific to the person (step S52).

Furthermore, the simple response/statement determining section 102 determines, according to each of the respective calculated rates of utterance for the persons, the first period and second period for each person (step S53). For example, the simple response/statement determining section 102 holds a data table showing each rate of utterance and the first and second periods associated with the rate of utterance, refers to the data table to retrieve, for each person, the first and second periods associated with the calculated rate of utterance, and determines the retrieved first and second periods as the first and second periods for use in determination of whether to be a simple response or a statement for the person. The data table stores first and second periods that become longer as the rate of utterance is lower.

Since, as described above, the simple response/statement determining section 102 determines, according to the rate at which each of the persons P1, P2, and P3 speaks, the first and second periods for use in determination of whether to be a simple response or a statement for the person, it is possible to more accurately determine whether the utterance of each person is a simple response or a statement.

Figure 9:
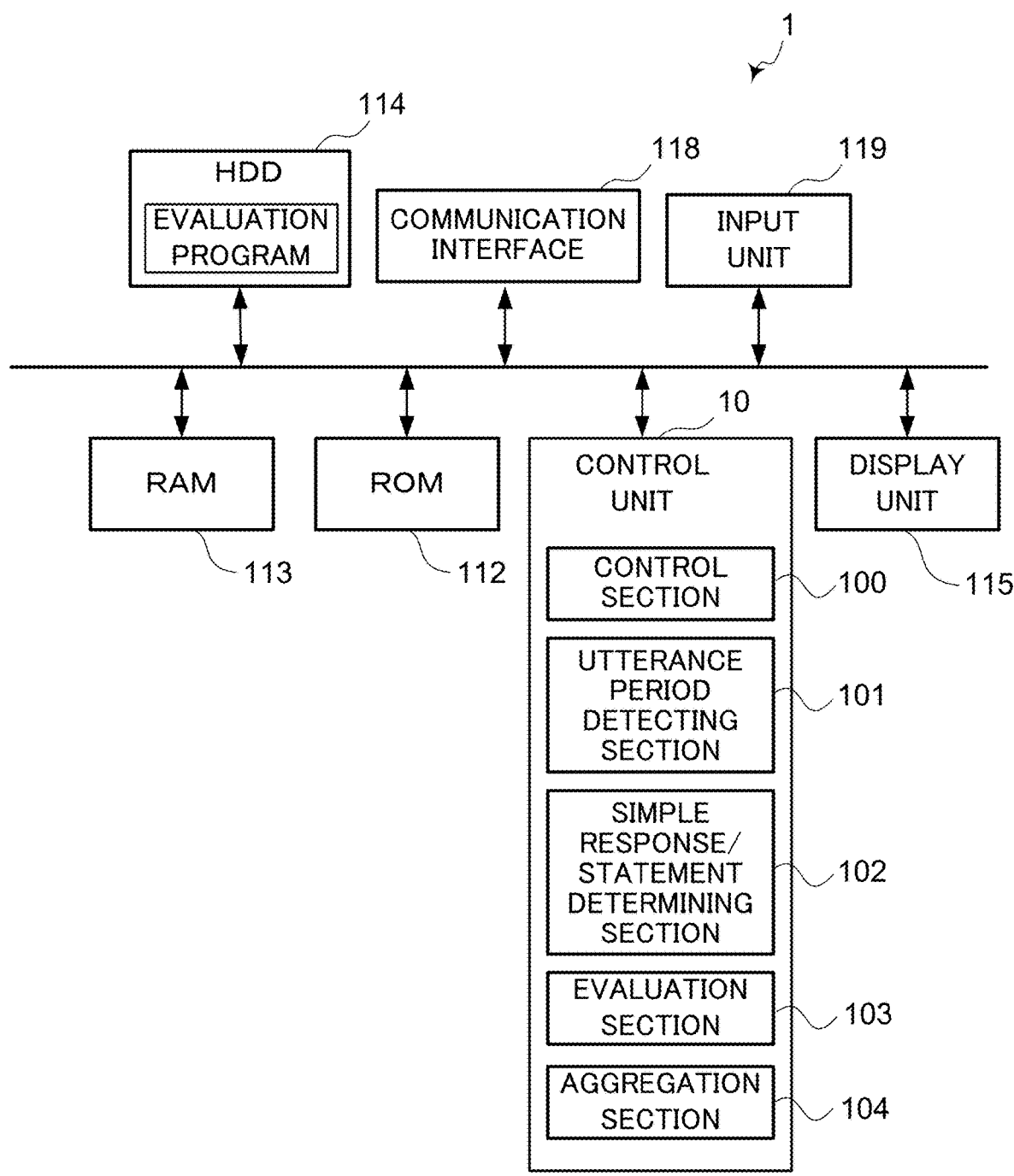
FIG. 9 is a block diagram showing an outline of an internal configuration of an information processing apparatus according to a second embodiment.

Next, a description will be given of the structure and configuration of an information processing apparatus 1 according to a second embodiment. FIG. 9 is a block diagram showing an outline of an internal configuration of the information processing apparatus 1 according to the second embodiment. In the description of the second embodiment, further explanation of the same components and functions as those of the information processing apparatus 1 according to the first embodiment explained with reference to FIG. 2 will be omitted.

In the second embodiment, the control unit 10 of the information processing apparatus 1 is, like the configuration shown in FIG. 2, formed of a processor, a RAM, a ROM, and so on. The processor is a CPU, an MPU, an ASIC or the like. When an evaluation program stored on an HDD 114 is executed by the processor described above, the control unit 10 functions not only as a control section 100, an utterance period detecting section 101, and a simple response/statement determining section 102, but also as an evaluation section 103 and an aggregation section 104. Alternatively, the control section 100, the utterance period detecting section 101, the simple response/statement determining section 102, the evaluation section 103, and the aggregation section 104 may be constituted by hardware circuits.

The control section 100, the utterance period detecting section 101, and the simple response/statement determining section 102 have the same functions as those in the configuration of the first embodiment described with reference to FIG. 2. Also in this embodiment, the simple response/statement determining section 102 allows the HDD 114 to store, on the basis of each of the persons P1, P2, and P3, the determination results each indicating that the utterance is a simple response or a statement, the respective utterance periods for simple responses and statements, and an extracted frequent keyword together.

The evaluation section 103 gives, on the basis of each of the determination results for each person stored on the HDD 114, a predetermined first evaluation point to a simple response and a predetermined second evaluation point different from the first evaluation point to a statement. For example, the evaluation section 103 gives to a statement the second evaluation point as a larger value (for example, 10 points) than the first evaluation point (for example, 1 point) to a simple response.

The aggregation section 104 aggregates, for each of the persons P1, P2, and P3, the first evaluation points and second evaluation points given by the evaluation section 103. The control section 100 outputs the aggregate result for each person, for example, to the display unit 115 and allows the display unit 115 to display the person-by-person aggregate results. Alternatively, the control section 100 outputs data indicating the person-by-person aggregate results through the communication interface 118 to a computer connected via a network to the information processing apparatus 1. Thus, on the computer, the data indicating the person-by-person aggregate results can be printed out or displayed.

Furthermore, the aggregation section 104 creates image data graphically representing the person-by-person aggregate results. The control section 100 outputs the image data graphically representing the person-by-person aggregate results to the display unit 115 and allows the display unit 115 to display the image data.

Figure 10:
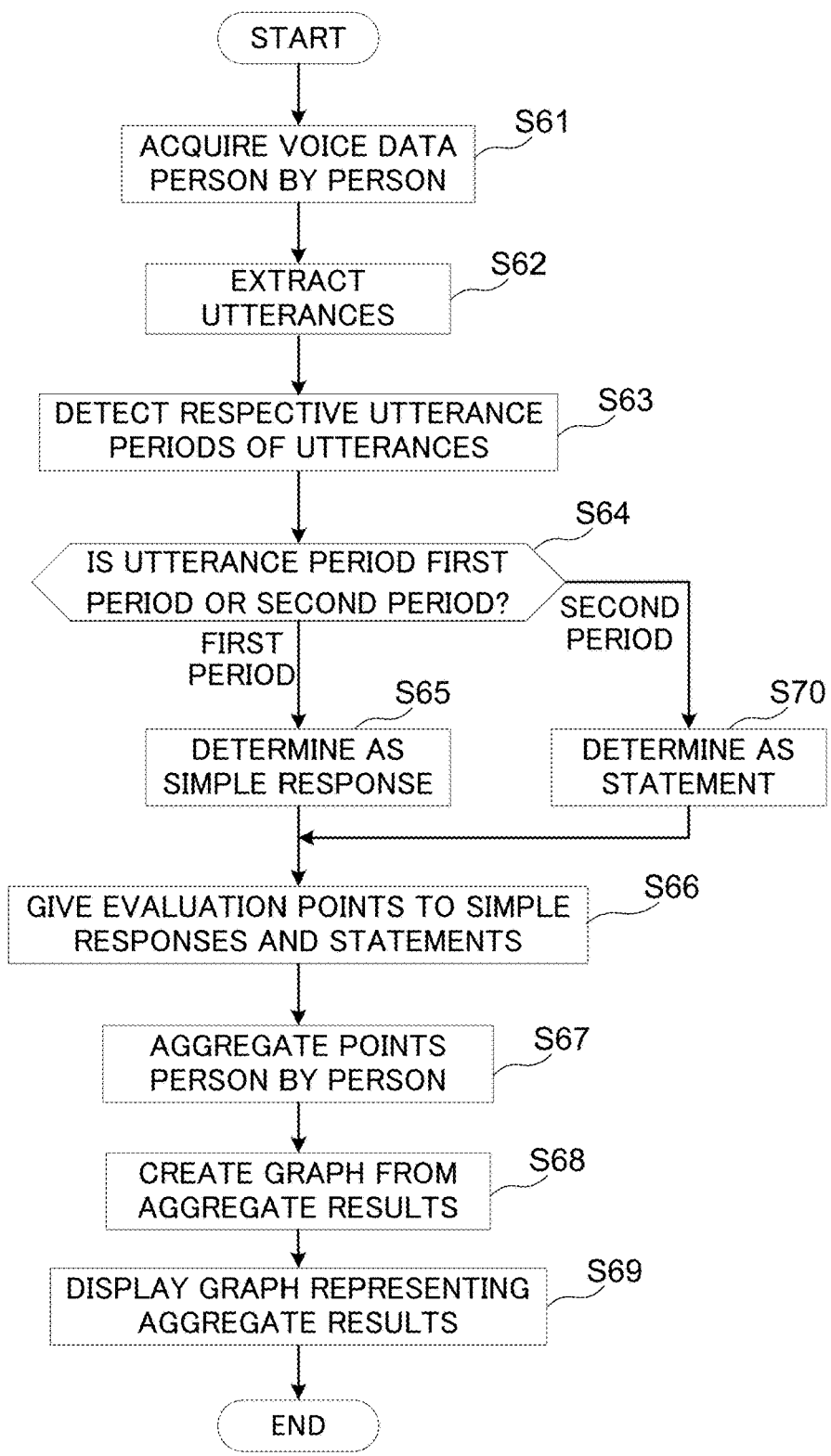
FIG. 10A is a flowchart showing evaluation processing for evaluating each utterance of each person, executed by the information processing apparatus according to the second embodiment.
FIG. 10B is a graph showing an example of an image graphically representing aggregate results which are person-by-person aggregations of first evaluation points and second evaluation points.

Next, a description will be given of evaluation processing for evaluating each utterance of each person, executed by the information processing apparatus 1 according to the second embodiment. FIG. 10A is a flowchart showing the evaluation processing for evaluating each utterance of each person, executed by the information processing apparatus 1 according to the second embodiment. FIG. 10B is a graph showing an example of an image graphically representing aggregate results which are person-by-person aggregations of first evaluation points and second evaluation points for the individual persons P1, P2, and P3. Further explanation of the same processing stages as those of the speech analysis processing according to the first embodiment described with reference to FIG. 4 will be omitted In the evaluation processing according the second embodiment, after the simple response/statement determining section 102 performs the determination of simple responses (step S65) and the determination of statements (step S70) in the same manner as in the speech analysis processing described with reference to FIG. 4, the evaluation section 103 gives, on the basis of each of the determination results indicating that the utterances of the persons stored on the HDD 114 are simple responses or statements and on the basis of each of the simple responses and statements indicated by the determination results, the first evaluation point (for example, 1 point) to each simple response and the second evaluation point (for example, 10 points) to each statement (step S66). The simple response/statement determining section 102 gives the first evaluation point or the second evaluation point to every utterance (simple response or statement) of each of the persons P1, P2, and P3.

Subsequently, the aggregation section 104 aggregates, for each of the persons P1, P2, and P3, the first evaluation points and second evaluation points given by the evaluation section 103 (step S67). Furthermore, the aggregation section 104 creates an image graphically representing the aggregate results (step S68). As shown in FIG. 10B, the control section 100 outputs the image graphically representing the person-by-person aggregate results to the display unit 115 and allows the display unit 115 to display the image (step S69).

According to the second embodiment, the first evaluation point or the second evaluation point each represented by a number is given to each of simple responses and statements determined by the simple response/statement determining section 102 and the given first evaluation points and second evaluation points are aggregated on the basis of each of the persons P1, P2, and P3. Therefore, it is possible to evaluate the utterances of each person in a meeting based on the person-by-person aggregate results and objectively present the evaluation result. Thus, the user can objectively know the evaluation of the utterances of each person in the meeting.

Figure 11:
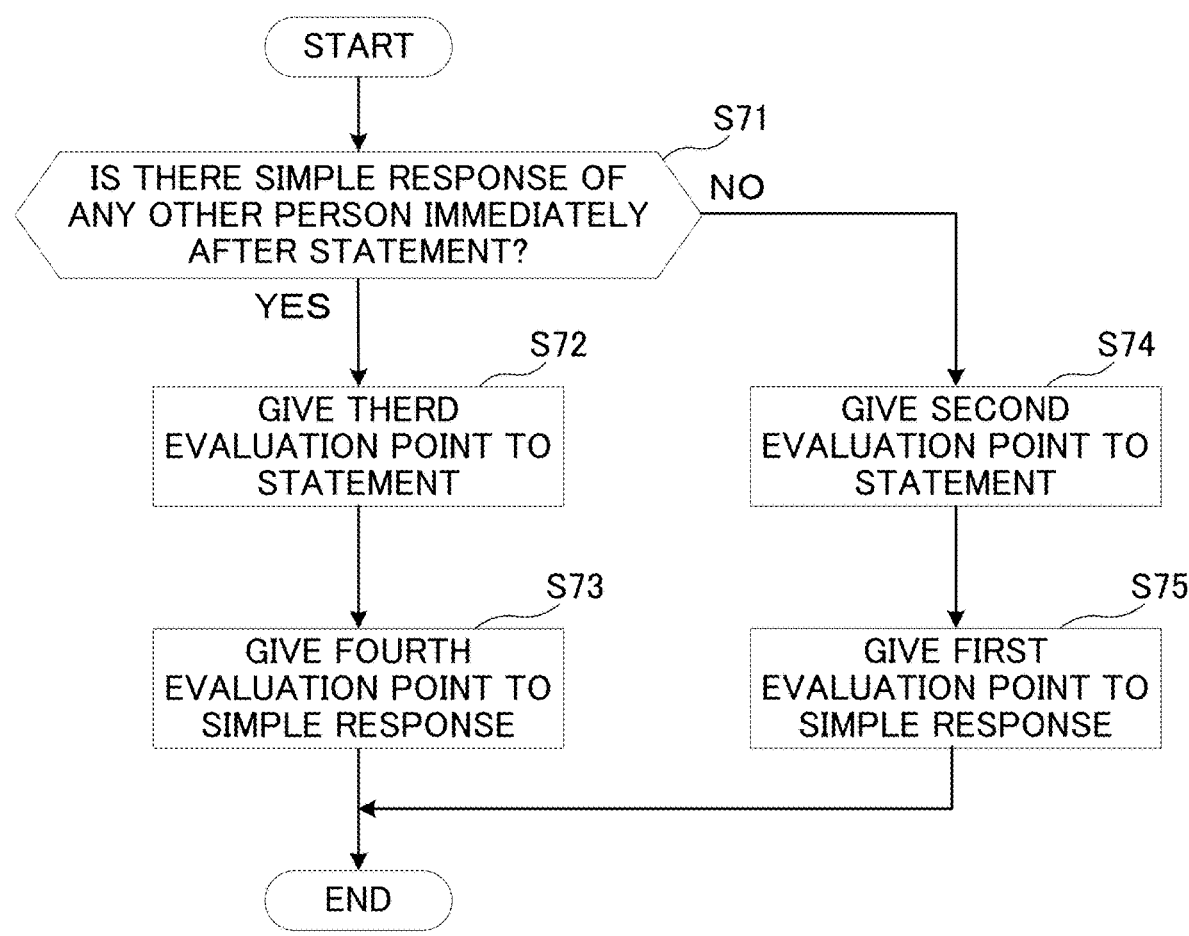
FIG. 11 is a flowchart showing processing for giving the second evaluation point for each statement differently according to the presence or absence of a simple response to the statement.

The evaluation section 103 may give the second evaluation point for each statement differently according to the presence or absence of a simple response to the statement. FIG. 11 is a flowchart showing processing for giving the second evaluation point for each statement differently according to the presence or absence of a simple response to the statement. This processing is executed at the time of processing for giving a point in step S66 shown in FIG. 10A.

After the simple response/statement determining section 102 performs the determination of simple responses (step S65) and the determination of statements (step S70), the evaluation section 103 determines whether or not there is any simple response made in timing immediately after a statement of a person and subsequently by another person (step S71). When determining that there is a simple response made in the timing (YES in step S71), the evaluation section 103 gives, as an evaluation point for the statement, a predetermined third evaluation point (for example, 20 points) larger than the second evaluation point to the statement (step S72).

When determining in step S71 that there are a plurality of simple responses made in timing immediately after a statement made by a person, the evaluation section 103 may give a value (for example, 25 points) further increased from the third evaluation point to the statement. The meaning of "there are a plurality of simple responses" may be the case where a plurality of persons made simple responses or the case where one person made a plurality of simple responses.

Furthermore, the evaluation section 103 gives, to a simple response subsequently made in timing immediately after a statement made by a person, a predetermined fourth evaluation point (for example, 2 points) larger than the first evaluation point (step S73).

When determining in step S73 that there are a plurality of simple responses made in timing immediately after a statement made by a person, the evaluation section 103 may give, to each of the simple responses, a value (for example, 3 points) further increased from the fourth evaluation point. The meaning of "there are a plurality of simple responses" may be the case where a plurality of persons made simple responses or the case where one person made a plurality of simple responses.

On the other hand, when determining that there is no simple response made in timing immediately after a statement made by a person (NO in step S71), the evaluation section 103 gives, as an evaluation point for the statement, the second evaluation point to the statement (step S74).

Furthermore, the evaluation section 103 gives, to a simple response made in timing not immediately after a statement made by a person, the first evaluation point (step S75). Note that in the second embodiment the third evaluation point is set to be larger than the fourth evaluation point.

As described above, a statement of a person immediately after which another person made a simple response and which is assumed to be a good statement having attracted the other person's interest is given a higher evaluation point than other statements not followed by any simple response.

Therefore, it is possible to appropriately offer a high evaluation to a statement assumed to be good.

Furthermore, a simple response subsequently made by a person immediately after a statement of another person is assumed to be an appropriate simple response having expressed his/her own opinion regarding the statement of the other person and, therefore, the simple response is given a higher evaluation point than simple responses made in other timings. Thus, it is possible to give a high evaluation to a simple response assumed to have been made appropriately.

Figure 12:
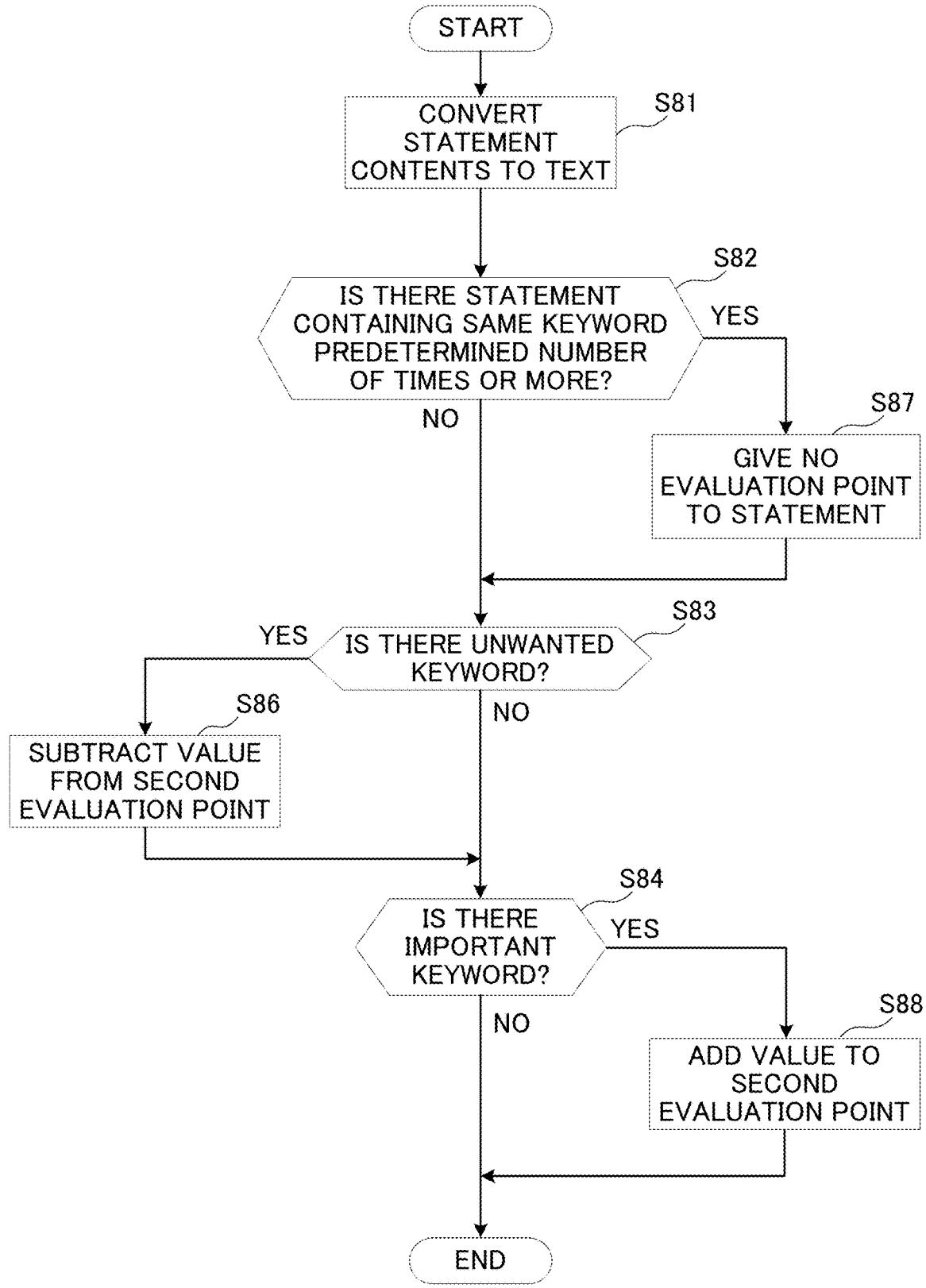
FIG. 12 is a flowchart showing processing for giving the second evaluation point for each statement differently according to the keyword contained in the statement.

The evaluation section 103 may give the second evaluation point for each statement differently according to the keyword contained in the statement. FIG. 12 is a flowchart showing processing for giving the second evaluation point for each statement differently according to the keyword contained in the statement. This processing is executed at the time of processing for giving a point in step S66 shown in FIG. 10A. Furthermore, the second evaluation point determined by this processing is used also as the second evaluation point in the processing shown in FIG. 11.

After performing the determination of simple responses (step S65) and the determination of statements (step S70), the simple response/statement determining section 102 converts the contents of all the utterances (at least statements) of the persons P1, P2, and P3 to texts, for example, by the voice recognition function (step S81). Alternatively, the processing for conversion to texts may be performed by the evaluation section 103.

After the simple response/statement determining section 102 performs the above processing for conversion to texts, the evaluation section 103 detects, from all the utterances made by each of the persons P1, P2, and P3, words contained in the utterances. If the same word (keyword) is detected a plurality of times, the evaluation section 103 counts the number of detections of the word. The evaluation section 103 performs the counting for each statement.

Then, the evaluation section 103 determines whether or not there is any statement containing the same word a predetermined number of times (for example, five times) or more (step S82). When determining that there is a statement containing the same word the predetermined number of times or more (YES in step S82), the evaluation section 103 sets the statement as a statement not given the second evaluation point (step S87). If there is no statement where the same word appears the predetermined number of times or more, the evaluation section 103 does not make the above setting (NO in step S82).

Furthermore, the evaluation section 103 determines, about all the statements made by each of the persons P1, P2, and P3, whether or not there is any statement containing a predetermined unwanted keyword (for example, a predetermined word irrelevant to the current meeting or a predetermined inappropriate word, such as "I can't take it anymore") (step S83). When determining that there is any statement containing an unwanted keyword (YES in step S83), the evaluation section 103 sets the value of the second evaluation point to be given to the statement containing an unwanted keyword to a value (for example, 5 points) obtained by subtracting a predetermined subtractive value (for example, 5 points) from the initial second evaluation point (step S86). If there is no statement containing any unwanted keyword, the evaluation section 103 does not perform the above subtraction (NO in step S83).

Subsequently, the evaluation section 103 determines, about all the statements made by each of the persons P1, P2, and P3, whether or not there is any statement containing a predetermined important keyword (for example, a predetermined word desired to be uttered in the current meeting, such as "charge", "development", "exposure" or other relevant words in a meeting about the development of an image formation mechanism of an image forming apparatus) (step S84).

When determining that there is any statement containing an important keyword (YES in step S84), the evaluation section 103 sets the value of the second evaluation point to be given to the statement containing an important keyword to a value (for example, 15 points) obtained by adding a predetermined additive value (for example, 5 points) to the initial second evaluation point (step S88). If there is no statement containing any important keyword, the evaluation section 103 does not perform the above addition (NO in step S84).

Thereafter, the evaluation section 103 uses, as a second evaluation point for each statement, the calculated second evaluation point at the end of the above processing shown in FIG. 12, such as the value of the second evaluation point after being subjected to the above addition or subtraction or the initial second evaluation point.

The evaluation processing enables the determination of appropriate evaluation contents according to the contents of a statement, such as making a low evaluation of not giving the second evaluation point to a statement in which the same thing was repeated a lot of times in a single statement and which is therefore assumed to be unuseful (step S87), downgrading the evaluation of a statement in which an unwanted word was uttered and which is therefore assumed to be less contributory to a meeting, by subtraction from the second evaluation point (step S86), or upgrading the evaluation of a statement in which an important ward was uttered and which is therefore assumed to be highly contributory to a meeting, by addition to the second evaluation point (step S88).

Figure 13:
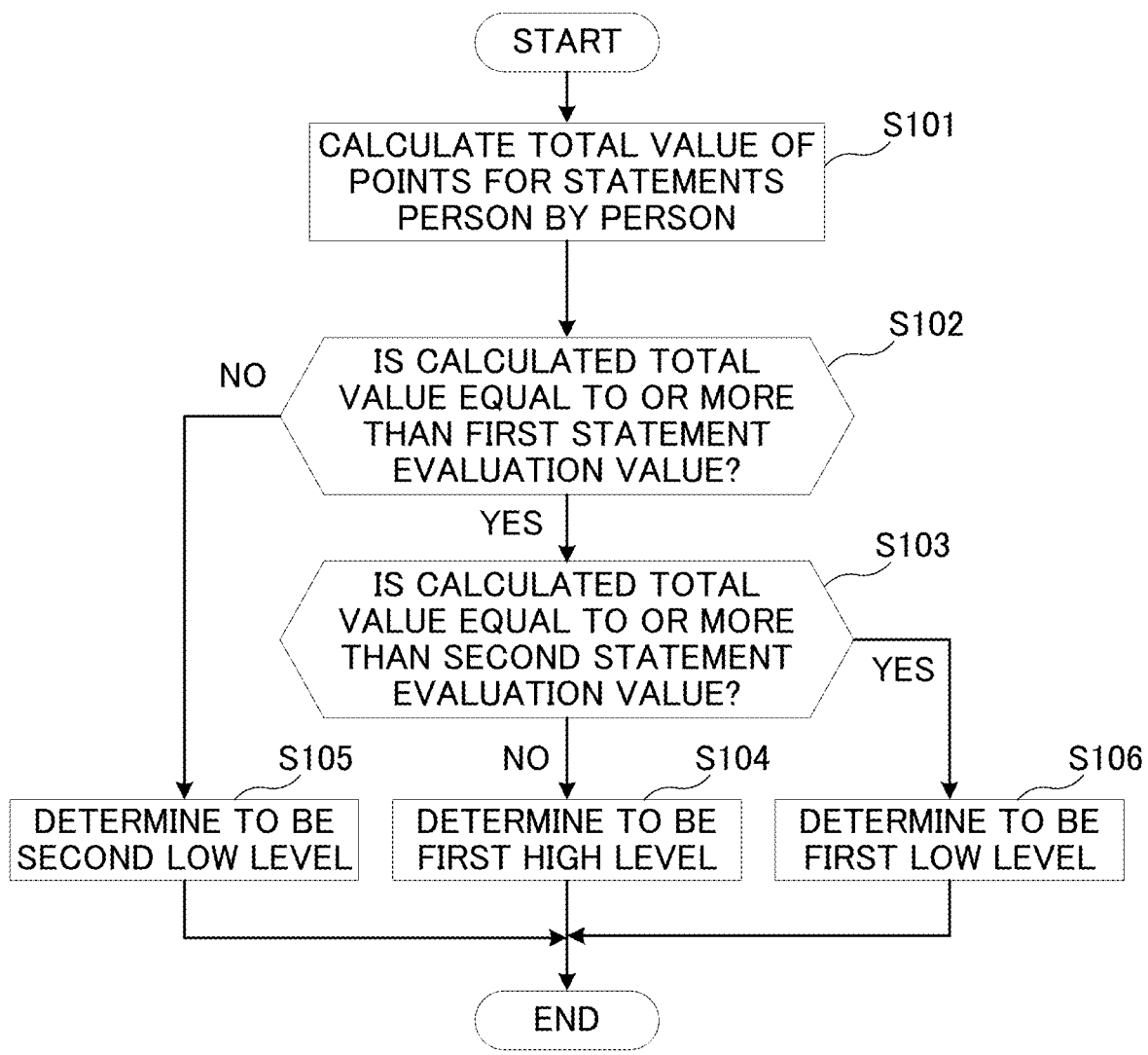
FIG. 13 is a flowchart showing evaluation level determination processing for making an evaluation of each person.

Next, a description will be given of evaluation level determination processing for determining the evaluation level of each of the persons P1, P2, and P3 after the giving of evaluation points as described above. FIG. 13 is a flowchart showing the evaluation level determination processing for evaluating each of the persons P1, P2, and P3.

As the evaluation level determination processing for determining the evaluation level of each person, a description will be given of a method of doing the determination by focusing on statements made by each person. In this case, the aggregation section 104 aggregates, for each of the persons P1, P2, and P3, the second evaluation points given to the statements of the person to calculate a total value (step S101).

Then, the evaluation section 103 determines, about each of the person-by-person total values obtained by the aggregation of the aggregation section 104, whether or not the total value is equal to or more than a predetermined first statement evaluation value (step S102). When at this time determining that there is any total value less than the above first statement evaluation value (NO in step S102), the evaluation section 103 determines the evaluation of the person having this total value for statements to be a second low level (step S105). The second low level is a low evaluation level to be given to a person referring to a person having made no statement in a meeting or any person like that.

On the other hand, when determining that there is any total value equal to or more than the first statement evaluation value (YES in step S102), the evaluation section 103 further determines whether or not this total value is equal to or more than a predetermined second statement evaluation value larger than the first statement evaluation value (step S103). In other words, the second statement evaluation value is a value indicating the number of statements assumed to be excessively large.

When at this time determining that the total value is equal to or more than the above second statement evaluation value (YES in step S103), the evaluation section 103 determines the evaluation of the person having this total value for statements to be a first low level (step S106). The first low level is a low evaluation level to be given to a person referring to a person having made statements in a meeting but having not contributed to the meeting because of an excessive large number of statements or any person like that.

On the other hand, when determining that the total value is less than the above second statement evaluation value (NO in step S103), the evaluation section 103 determines the evaluation of the person having this total value for statements to be a first high level (step S104). The first high level is a high evaluation level to be given to a person referring to a person having made an appropriate number of statements in a meeting and therefore having contributed to the meeting or any person like that.

This evaluation level determination processing enables appropriate determination of the degrees of contribution of persons having made statements to a meeting according to the number of statements made by each person.

Figure 14:
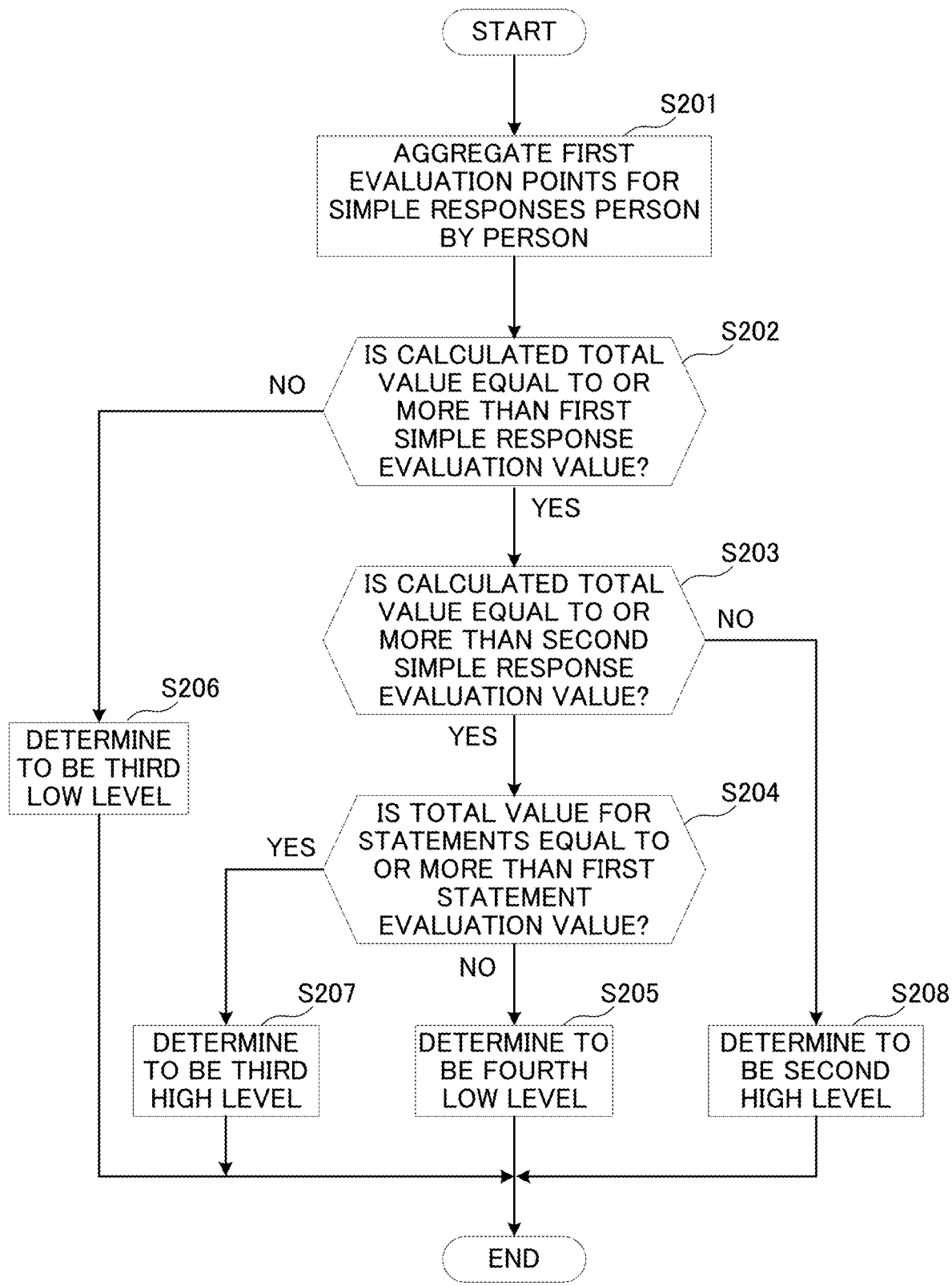
FIG. 14 is a flowchart showing a first modification of the evaluation level determination processing for making an evaluation of each person.

Next, a description will be given of a first modification of the evaluation level determination processing for determining the evaluation level of each of the persons P1, P2, and P3 after the giving of evaluation points as described above. FIG. 14 is a flowchart showing the first modification of the evaluation level determination processing for evaluating each of the persons P1, P2, and P3.

As the evaluation level determination processing for determining the evaluation level of each person, a description will be given of a method of doing the determination by focusing on simple responses made by each person. In this case, the aggregation section 104 aggregates, for each of the persons P1, P2, and P3, the first evaluation points given to the simple responses of the person to calculate a total value (step S201).

Then, the evaluation section 103 determines, about each of the person-by-person total values obtained by the aggregation of the aggregation section 104, whether or not the total value is equal to or more than a predetermined first simple response evaluation value (step S202). When at this time determining that there is any total value less than the first simple response evaluation value (NO in step S202), the evaluation section 103 determines the evaluation of the person having this total value for simple responses to be a third low level (step S206). The third low level is a low evaluation level to be given to a person referring to a person having made no simple response in a meeting (a person assumed not to have listened to statements of the other persons) or any person like that.

On the other hand, when determining that there is any total value equal to or more than the first simple response evaluation value (YES in step S202), the evaluation section 103 further determines whether or not this total value is equal to or more than a predetermined second simple response evaluation value larger than the first simple response evaluation value (step S203).

When at this time determining that the total value is less than the above second simple response evaluation value (NO in step S203), the evaluation section 103 determines the evaluation of the person having this total value for simple responses to be a predetermined second high level (step S208). The second high level is a high evaluation level to be given to a person referring to a person having made an appropriate number of simple responses in a meeting and therefore having listened well to statements of the other persons or any person like that.

On the other hand, when the evaluation section 103 determines that the total value is equal to or more than the second simple response evaluation value (YES in step S203), the aggregation section 104 further aggregates, for each of the persons P1, P2, and P3, the second evaluation points given to the statements of the person to calculate a total value for statements and the evaluation section 103 determines whether or not the total value for statements is equal to or more than the above first statement evaluation value (step S204).

When at this time determining that the total value for statements is less than the first statement evaluation value (NO in step S204), the evaluation section 103 determines the evaluation of the person having this total value for statements to be a fourth low level (step S205). The fourth low level is a low evaluation level to be given to a person referring to a person having made simple responses in a meeting but having not made many statements in the meeting because of an excessive large number of simple responses or any person like that.

On the other hand, when determining that the total value for statements is equal to or more than the first statement evaluation value (YES in step S204), the evaluation section 103 determines the evaluation of the person having this total value for statements to be a third high level (step S207). The third high level is a high evaluation level to be given to a person referring to a person having made an excessive number of simple responses in a meeting, but also having made many statements, and therefore having contributed to the meeting or any person like that.

This evaluation level determination processing enables appropriate determination of the degrees of contribution of persons having made simple responses to a meeting according to the number of simple responses made by each person and the number of statements made by the person.

Figure 15:
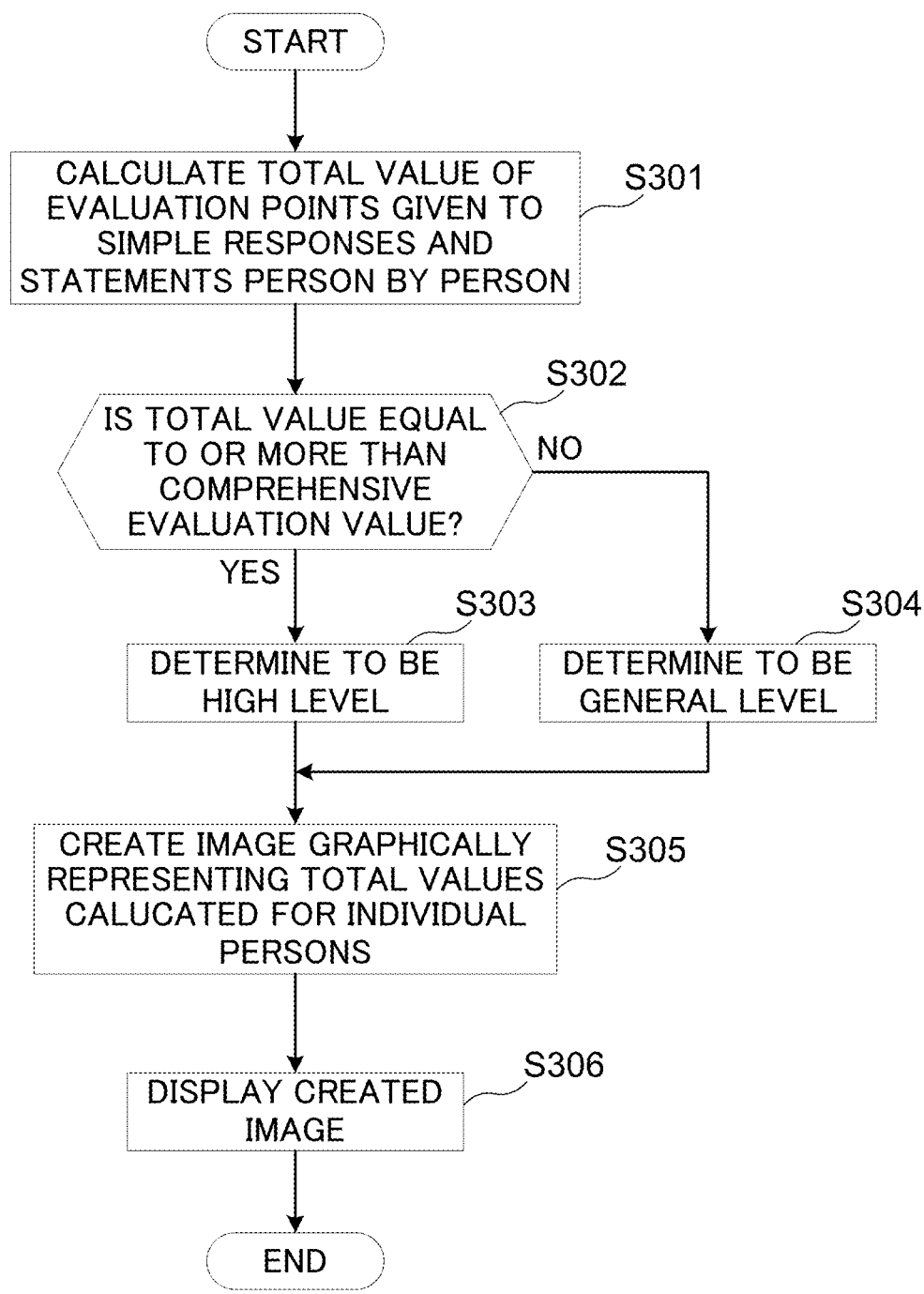
FIG. 15 is a flowchart showing a second modification of the evaluation level determination processing for making an evaluation of each person.

Next, a description will be given of a second modification of the evaluation level determination processing for determining the evaluation level of each of the persons P1, P2, and P3 after the giving of evaluation points as described above. FIG. 15 is a flowchart showing the second modification of the evaluation level determination processing for evaluating each of the persons P1, P2, and P3.

A description will be given of the processing for performing the evaluation level determination in which the evaluation level of each person is determined, by focusing on the total value of evaluation points given to simple responses and statements made by each person.

In this case, the aggregation section 104 calculates, for each of the persons P1, P2, and P3, the total value of evaluation points given to the simple responses and statements of the person (step S301). The aggregation section 104 can calculate the total value of all the types of evaluation points given to the simple responses and statements in the second embodiment.

Subsequently, the evaluation section 103 determines whether or not the total value is equal to or more than a predetermined comprehensive evaluation value (step S302). The comprehensive evaluation value is a value predetermined to determine whether or not each person has contributed to a meeting. For example, 50 points are used as a comprehensive evaluation value for a 10-minute meeting.

When at this time determining that the total value for simple responses and statements is equal to or more than the above comprehensive evaluation value (YES in step S302), the evaluation section 103 determines the comprehensive evaluation of the person having this comprehensive evaluation value to be a predetermined high level (step S303). The high level is a high evaluation to be given to a person referring to a person having made an appropriate number of simple responses and statements in a meeting and therefore having contributed to the meeting or any person like that.

On the other hand, when determining that the total value for simple responses and statements is less than the comprehensive evaluation value (NO in step S302), the evaluation section 103 determines the comprehensive evaluation of the person having this comprehensive evaluation value to be a predetermined general level (step S304). The general level is an evaluation to be given to a person referring to a person having contributed to the meeting less than a person given the high level has done or any person like that.

Subsequently, the evaluation section 103 creates an image graphically representing the respective total values of evaluation points calculated for the individual persons P1, P2, and P3 (step S305). The control section 100 allows the display unit 115 to display the created image (step S306).

Figure 16:
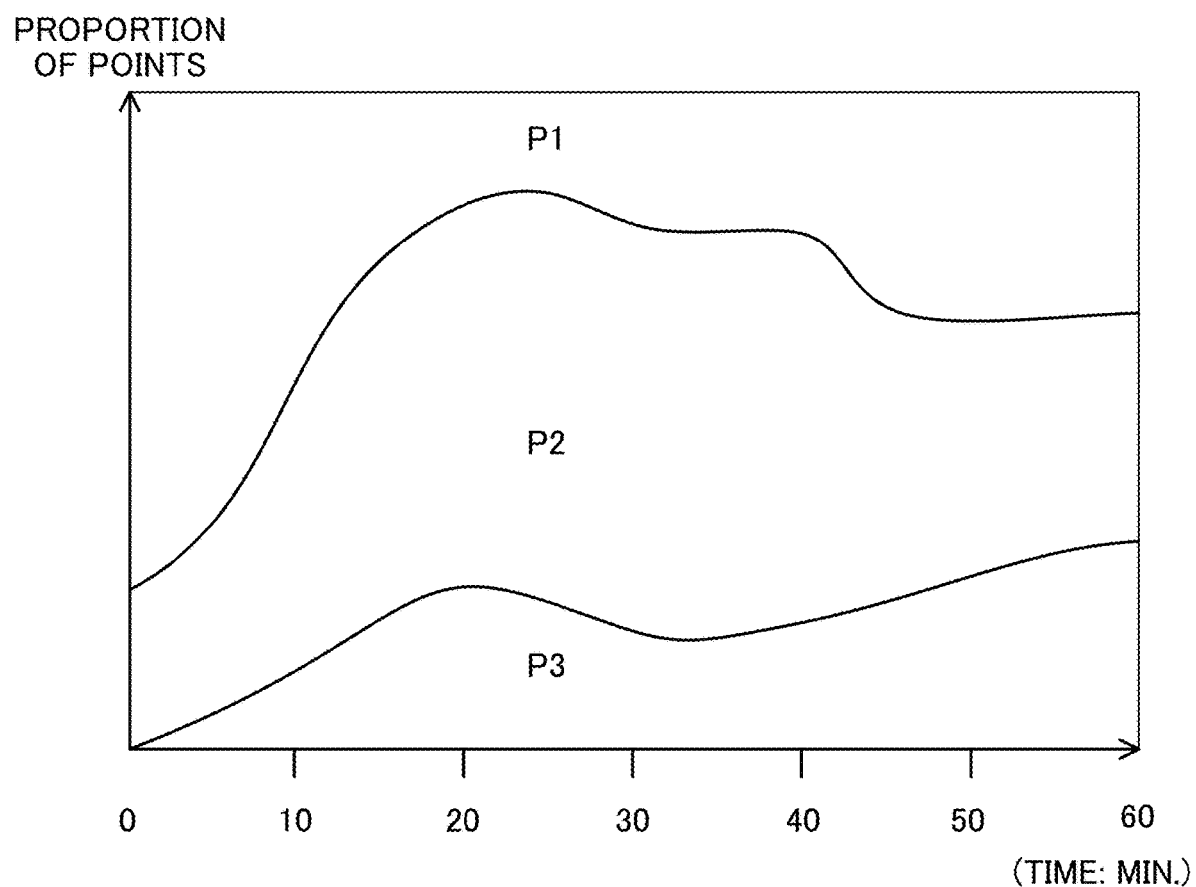
FIG. 16 is a graph showing an example of an image created by an evaluation section and graphically representing the total values of evaluation points.

FIG. 16 is a graph showing an example of an image created by the evaluation section 103 and graphically representing the total values of evaluation points. The image shown in FIG. 16 is created, by the evaluation section 103, with the horizontal axis representing time (passage of time) and the vertical axis representing the proportion of points for each person (where the width indicating points for each person in the vertical direction is a width corresponding to the proportion of points for the person). The proportion of points refers to the proportion of the total value of evaluation points for each person relative to the aggregate of the total values of evaluation points calculated for the individual persons.

Reference to the image shown in FIG. 16 enables the user to visually perceive, along the passage of time, the individual degrees of contribution of the persons P1, P2, and P3 to a meeting and time-series changes in their respective proportions of the degrees of contribution. For example, it can be perceived that, 10 minutes after the beginning of the meeting, the persons having contributed to the meeting are, in order of degree of contribution from highest to lowest, the person P1, the person P2, and the person P3, the person P2 then has reached the highest degree of contribution about 15 minutes after the beginning, and the persons P1, P2, and P3 then have reached substantially equal degrees of contribution 60 minutes after the beginning, i.e., at the end of the meeting.

The structures, configurations, and processing described in the above embodiments with reference to FIGS. 1 to 16 are merely embodiments of the present invention and not intended to limit the present invention to these structures, configurations, and processing. For example, in addition to at least an image forming apparatus having the same configuration as that shown in FIG. 2, other information processing apparatuses, such as a personal computer or a communication terminal device, having the same configuration as that shown in FIG. 2 can also be applied as the information processing apparatus 1 to the present invention.

The invention claimed is:
1. An information processing apparatus comprising:
a communication interface through which data is communicated externally;
an utterance period detecting section that extracts utterances of each of persons from voice data acquired through the communication interface and detects respective utterance periods of the extracted utterances;
a simple response/statement determining section that converts the voice data to a text, determines whether or not each of the utterance periods detected by the utterance period detecting section falls within a predetermined first period, determines, when an utterance falling within the first period contains any of predetermined keywords, that the utterance is a simple response, determines an utterance made for a predetermined second period longer than the first period to be a statement, and extracts, for each of the persons, a frequent keyword appearing a predetermined number of times or more in the utterances of a person; and
a storage unit that stores results determined by the simple response/statement determining section, an utterance period for the simple response, and an utterance period for the statement, together with the frequent keyword,
wherein when the utterance contains a specific keyword further specified from among the predetermined keywords, the simple response/statement determining section determines the utterance to be a simple response and also determines the utterance to be an agreement response indicating consent.

2. The information processing apparatus according to claim 1, further comprising a display unit that displays the determined results, the utterance period for the simple response, and the utterance period for the statement, all of which are stored in the storage unit.

3. The information processing apparatus according to claim 1, wherein
the utterance period detecting section detects, from each of respective pieces of voice data on a plurality of persons, the respective utterance periods of the utterances person by person,
the simple response/statement determining section determines, based on each of the utterance periods for the individual person detected by the utterance period detecting section, whether the utterance is the simple response or the statement, and
the storage unit stores, for each of the persons, the results determined by the simple response/statement determining section, the utterance period for the simple response, and the utterance period for the statement.

4. An information processing apparatus comprising:
a communication interface through which data is communicated externally;
a storage unit; and
a control unit that includes a processor and, upon execution of a speech analysis program by the processor, functions as:
an utterance period detecting section that extracts utterances of each of persons from voice data acquired through the communication interface and detects respective utterance periods of the extracted utterances; and
a simple response/statement determining section that converts the voice data to a text, determines whether or not each of the utterance periods detected by the utterance period detecting section falls within a predetermined first period, determines, when an utterance falling within the first period contains any of predetermined keywords, that the utterance is a simple response, determines an utterance made for a predetermined second period longer than the first period to be a statement, extracts, for each of the persons, a frequent keyword appearing a predetermined number of times or more in the utterances of a person, and allows the storage unit to store determination results each indicating that the utterance is the simple response or the statement, an utterance period for the simple response, and an utterance period for the statement, together with the frequent keyword, wherein when the utterance contains a specific keyword further specified from among the predetermined keywords, the simple response/statement determining section determines the utterance to be a simple response and also determines the utterance to be an agreement response indicating consent.

5. The information processing apparatus according to claim 4, further comprising a display unit, wherein the control unit further functions as a control section allowing the display unit to display the determination results, the utterance period for the simple response, and the period utterance period for the statement, all of which are stored in the storage unit.

6. The information processing apparatus according to claim 4, further comprising an image forming unit capable of forming an image on a recording medium, wherein the control unit further functions as a control section allowing the image forming unit to form on the recording medium an image representing the determination results, the utterance period for the simple response, and the utterance period for the statement, all of which are stored in the storage unit.

* * * * *